US011848931B2

(12) United States Patent
Liderman et al.

(10) Patent No.: US 11,848,931 B2
(45) Date of Patent: *Dec. 19, 2023

(54) DELEGATED AUTHENTICATION TO CERTIFICATE AUTHORITIES

(71) Applicant: VMware, Inc., Palo Alto, CA (US)

(72) Inventors: Eugene Liderman, Olney, MD (US); Rahul Parwani, Atlanta, GA (US); Kiran Rohankar, Atlanta, GA (US); Keith Robertson, Johns Creek, GA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/495,239

(22) Filed: Oct. 6, 2021

(65) Prior Publication Data

US 2022/0029990 A1     Jan. 27, 2022

Related U.S. Application Data

(63) Continuation of application No. 16/220,657, filed on Dec. 14, 2018, now Pat. No. 11,165,774.

(51) Int. Cl.
*H04L 9/40* (2022.01)
*H04L 9/32* (2006.01)
*G06F 9/54* (2006.01)

(52) U.S. Cl.
CPC .......... *H04L 63/0884* (2013.01); *G06F 9/546* (2013.01); *H04L 9/321* (2013.01); *H04L 9/3236* (2013.01); *H04L 9/3268* (2013.01); *H04L 63/083* (2013.01); *H04L 63/0823* (2013.01); *G06F 2209/548* (2013.01)

(58) Field of Classification Search
CPC ... H04L 63/0884; H04L 9/321; H04L 9/3236; H04L 9/3268; H04L 63/0823; H04L 63/083; G06F 9/546; G06F 2209/548
See application file for complete search history.

(56) References Cited

U.S. PATENT DOCUMENTS

| | | | | |
|---|---|---|---|---|
| 2002/0178271 | A1* | 11/2002 | Graham | H04L 63/101 709/229 |
| 2018/0062855 | A1* | 3/2018 | Bracken | H04L 9/14 |
| 2018/0316511 | A1* | 11/2018 | Meyer | G06F 9/45558 |
| 2019/0166117 | A1* | 5/2019 | Kumar | H04L 9/0891 |

* cited by examiner

*Primary Examiner* — Cheng-Feng Huang
(74) *Attorney, Agent, or Firm* — Thomas Horstemeyer, LLP

(57) ABSTRACT

Disclosed are various embodiments for delegating authentication to certificate authorities. A connector service identifies a certificate request from a messenger service. The certificate request includes a credential identifier for a certificate authority. An authentication credential is retrieved using the credential identifier. A certificate request and the certificate authority authentication credential are transmitted to the certificate authority. A certificate is retrieved and provided as a response to the certificate request.

20 Claims, 4 Drawing Sheets

… … …

DELEGATED AUTHENTICATION TO CERTIFICATE AUTHORITIES

CROSS-REFERENCE TO RELATED APPLICATIONS

This Application is a continuation of, and claims priority to and the benefit of, U.S. application Ser. No. 16/220,657, filed on Dec. 14, 2018, and entitled "DELEGATED AUTHENTICATION TO CERTIFICATE AUTHORITIES," which is hereby incorporated herein by reference in its entirety.

BACKGROUND

Enterprise services are often hosted by the vendor or the provider of the service off-premises, which is often referred to as being hosted in the cloud. For example, vendors of enterprise mobility management (EMM) services and mobile device management (MDM) services often offer a version that can be locally hosted by a customer and another version hosted by the vendor on behalf of the customer. In versions hosted on behalf of the customer, sensitive data (e.g., administrative and service account credentials) is often uploaded by the customer to the vendor's servers and databases. Should the vendor suffer a security breach, the customer's sensitive data may be exposed to unauthorized parties.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for delegating authentication with certificate authorities to third-parties. Often, an enterprise mobility management (EMM) or mobile device management (MDM) system will be operated by a vendor or provider of the EMM or MDM system. The computing systems and data stores are often operated by the vendor or provider of the EMM or MDM service. Sensitive data, such as administrative or system account credentials, is often stored by the provider of the EMM or MDM service in order for the EMM or MDM service to obtain and issue certificates to client devices. These credentials are often provided by the users of the EMM or MDM service hosted by the vendor or provider. In the event that the vendor or provider suffers a security breach, these credentials may be leaked to malicious third-parties or other unauthorized users or entities. To address this security risk, storage of authentication credentials can be delegated to the users of the EMM or MDM service, as described in further detail herein.

Figure 1:
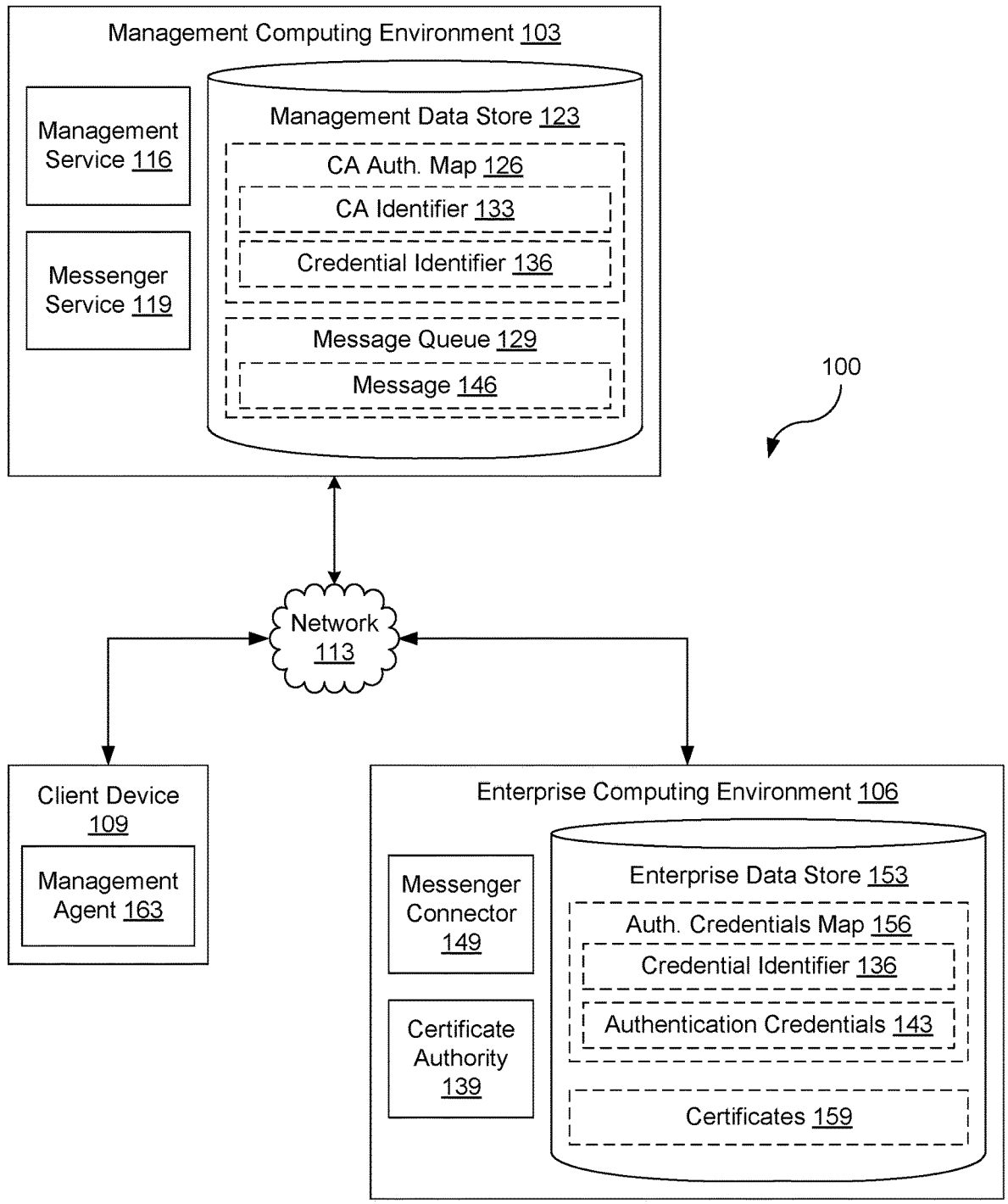
FIG. 1 is a drawing illustrating an example arrangement of a network environment according to various embodiments of the present disclosure.

With reference to FIG. 1, shown is a network environment 100 according to various embodiments. The network environment 100 includes a management computing environment 103, an enterprise computing environment 106, and a client device 109, which are in data communication with each other via a network 113. The network 113 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The management computing environment 103 or the enterprise computing environment 106 can include a server computer or any other system providing computing capability. Alternatively, the management computing environment 103 or the enterprise computing environment 106 can employ a plurality of computing devices that can be arranged in one or more server banks or computer banks or other arrangements. Such computing devices can be located in a single installation or distributed among many different geographical locations. For example, the management computing environment 103 or the enterprise computing environment 106 can include a plurality of computing devices that together form a hosted computing resource, a grid computing resource, or any other distributed computing arrangement. In some cases, the management computing environment 103 or the enterprise computing environment 106 can correspond to an elastic computing resource where the allotted capacity of processing, network, storage, or other computing-related resources can vary over time.

Various applications or other functionality can be executed in the management computing environment 103 according to various embodiments. The components executed in the management computing environment 103, for example, include a management service 116, a messenger service 119, and other applications, services, processes, systems, engines, or functionality not discussed in detail herein.

Also, various data can be stored in a management data store 123 that is accessible to the management computing environment 103. The management data store 123 can be representative of a plurality of data stores, which can include relational databases, object-oriented databases, hierarchical databases, hash tables or similar key-value data stores, as well as other data storage applications or data structures. The data stored in the management data store 123 is associated with the operation of the various applications or functional entities described below. This data can include one or more certificate authority (CA) authentication maps 126, a message queue 129, and potentially other data.

The CA authentication map 126 represents a table, mapping, key-value store, or other data structure that stores a relationship between a CA identifier 133 and a credential identifier 136. The CA identifier 133 can represent a unique identifier for a certificate authority 139. For example, the CA identifier 133 can include a hostname for the certificate authority 139, a globally unique identifier (GUID), a universally unique identifier (UUID), a security identifier (SID), or other identifier that uniquely identifies a certificate authority 139 with respect to another certificate authority 139. In some implementations, the CA identifier 133 can also represent a domain name (e.g., using the domain name "example.com" as an identifier for any certificate authority 139 that is authorized to issue certificates for the "example.com" domain).

The credential identifier 136 can represent an identifier of authentication credentials 143 for a certificate authority 139 that uniquely identifies the authentication credentials 143 with respect to other sets of authentication credentials 143 for the certificate authority 139. Various data structures or types can be used as a credential identifier 136. For example, the credential identifier 136 could represent a result of a cryptographic hash function applied to respective authentication credentials 143. As another example, the credential identifier 136 could be based on an incremented numeric counter (e.g., where the first set of authentication credentials 143 is identified by the number "1," the second set of authentication credentials 143 is identified by the number "2," etc.).

Authentication credentials 143 can include a combination of a username and password, a public-private authentication key pair, a pre-shared cryptographic key, an authentication certificate, or other authentication mechanism that allows a user or application to authenticate with the certificate authority 139 (e.g., for the purpose of issuing or revoking a certificate). A respective pair of a CA identifier 133 and a credential identifier 136 may be stored for each certificate authority 139.

The message queue 129 stores messages 146 to be delivered to an application executing on a computing device. For example, the messenger service 119 may create and store a message 146 in a message queue 129. A messenger connector 149 executing in the enterprise computing environment 106 may then retrieve one or more messages 146 from the message queue 129. In some instances, a message queue 129 may be created and associated with each instance of a messenger connector 149 executing in an enterprise computing environment 106. In other implementations, messages 146 destined for different messenger connectors 149 can be stored in a single message queue 129. A message 146 can include any data or command to be sent to the messenger connector 149 or other application or service. In some instances, a message 146 can include both a command, as well as data (e.g., function arguments) related to the command.

The management service 116 can be executed to administer the operation of client devices 109 registered or otherwise enrolled with the management service 116. To this end, the management service 116 can also provide mechanisms for a client device 109 to enroll or otherwise register with the management service 116. The management service 116 can also enforce the use of policies assigned to a client device 109, manage applications installed on client devices 109, and perform various other functions related to the management of enrolled client devices 109.

The messenger service 119 can be executed to send messages 146 to and receive messages 146 from client devices 109 or components of the enterprise computing environment 106. For example, the messenger service 119 may create a message 146 for a computing device, application, or service and store the message 146 in a message queue 129 in response to an action performed by the management service 116. The messenger service 119 can also periodically check the message queue 129 for messages received from respective computing devices or applications. In some instances, the messenger service 119 may also directly receive a message 146 from a computing device, application, or service.

Various applications or other functionality can be executed in the enterprise computing environment 106 according to various embodiments. The components executed in the enterprise computing environment 106, for example, include a messenger connector 149, a certificate authority (CA) 139, and other applications, services, processes, systems, engines, or functionality not discussed in detail herein.

Also, various data can be stored in an enterprise data store 153 that is accessible to the enterprise computing environment 106. The enterprise data store 153 can be representative of a plurality of data stores, which can include relational databases, object-oriented databases, hierarchical databases, hash tables or similar key-value data stores, as well as other data storage applications or data structures. The data stored in the enterprise data store 153 is associated with the operation of the various applications or functional entities described below. This data can include one or more authentication credentials maps 156, certificates 159, and potentially other data.

The authentication credentials map 156 stores a record of a relationship between a credential identifier 136 and authentication credentials 143. The authentication credentials map 156 can include a table, map, key-value store, or similar data structure. As previously discussed, authentication credentials 143 can include a combination of a username and password, a public-private authentication key pair, an authentication certificate, or other authentication mechanism that allows a user or application to authenticate with the certificate authority 139 (e.g., for the purpose of issuing or revoking a certificate).

The certificates 159 represent cryptographic certificates 159 issued by a certificate authority 139. A certificate 159 can represent a certification or verification of the ownership of a public key identified by the certificate 159. For example, a certificate 159 can include information about a public key of a public-private key-pair (e.g., a fingerprint of a public key or a copy of the public key itself), an identity of the owner of the public key (e.g., the name of the owner and contact information for the owner), and a digital signature that verifies the contents of the certificate 159. Certificates 159 can be used for various purposes, such as verifying the identity of an individual, a machine, or an application, encrypting communications between parties, code-signing, and other purposes.

The certificate authority 139 can be executed to issue certificates 159 to users, applications, or machines that submit a request for a certificate 159. The certificate authority 139 can verify the identity of the user, application, or machine. The certificate authority 139 can also determine whether the user, application, or machine is authorized to receive a certificate 159 from the certificate authority 139.

The messenger connector 149 can be executed to retrieve messages 146 from the message queue 129 and send messages 146 to the messenger service 119. For example, the messenger connector 149 can regularly send a request to the messenger service 119 for any messages 146 stored in the message queue 129 allocated for the enterprise computing environment 106. The messenger connector 149 can also send a message 146 to the messenger service 119 when information needs to be passed to the messenger service 119 (e.g., a response to a message 146 retrieved from the message queue 129). Because the messenger connector 149 initiates each communication with the messenger service 119, a firewall for the enterprise computing environment 106 does not need to be configured to leave a port open to receive messages 146.

The client device 109 is representative of a plurality of client devices that can be coupled to the network 113. The client device 109 can include, for example, a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc [DVD] players, set-top boxes, and similar devices), a videogame console, or other devices with like capability. The client device 109 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 109 or can be connected to the client device 109 through a wired or wireless connection. The client device 109 can also be configured to execute various applications such as an operating system, a management agent 163, and potentially other client applications.

The management agent 163 can be executed to interact with the management service 116 on behalf of the client device 109. For example, the management agent 163 can be used to register the client device 109 with the management service 116, maintain data communication with the management service 116, enforce the policies received from the management service 116, or perform commands received from the management service 116. For instance, the management agent 163 can maintain (e.g., update, reconfigure, uninstall, etc.) managed applications installed on the client device 109 according to one or more policies. As another example, the management agent 163 can request, install, and manage certificates 159 provided by the certificate authority 139.

Next, a general description of the operation of the various components of the network environment 100 is provided. More specific and detailed descriptions of the individual components of the network environment 100 are provided with the discussion of subsequent figures.

To begin, the management agent 163 sends a request for a certificate 159 to the management service 116. The request for the certificate 159 may be sent as part of an enrollment or registration process. However, the request for the certificate 159 may also be sent in other contexts (e.g., upon first use of an application that uses certificates 159 for user or device authentication). The request may include information related to the request for the certificate 159, such as a CA identifier 133 for the certificate authority 139 and the type of certificate 159 to be issued.

In response, the management service 116 creates a request for a certificate 159. The management service 116 can use the CA identifier 133 to retrieve a respective credential identifier 136 from the CA authentication map 126 in the management data store 123. The management service 116 can then send the certificate request and the credential identifier 136 to the messenger service 119.

The messenger service 119 can then create a message 146. The message 146 can contain the credential identifier 136 selected by the management service 116 and the certificate request. The messenger service 119 can then identify a message queue 129 for the respective certificate authority 139 and store the message 146 in the message queue 219. For example, the messenger service 119 may identify a message queue 129 associated with the CA identifier 133 and store the message 146 in the associated message queue 129.

Subsequently, the messenger connector 149 can send a request to the messenger service 119 for any messages 146 stored in the message queue 129. The request for messages 146 may be sent at periodic intervals (e.g., every minute, every two minutes, every five minutes, every hour, etc.). In response, the messenger service 119 can send the messages 146 stored in the message queue 129 to the messenger connector 149. The messenger service 119 may then delete the messages 146 from the message queue 129 after they have been sent to the messenger connector 149.

The messenger connector 149 can then parse or otherwise analyze the messages 146 retrieved from the messenger service 119 and initiate or perform an action based on the contents of a message 146. For example, the messenger connector 149 may evaluate a message 146 to determine that the message 146 includes a certificate request and a credential identifier 136. The messenger connector 149 can then retrieve respective authentication credentials 143 from the authentication credentials map 156 by querying the enterprise data store 153. For example, the messenger connector 149 may search the authentication credentials map 156 for the authentication credentials 143 stored in association with the credential identifier 136 included in the message 146.

After retrieving the authentication credentials 143, the messenger connector 149 can submit the certificate request to the certificate authority 139. The certificate request can include the authentication credentials 143 or the authentication credentials 143 may be subsequently submitted to the certificate authority 139 in response to a request for the authentication credentials from the certificate authority. For instance, the certificate authority 139 may evaluate the certificate request and then request the authentication credentials 143 from the messenger connector 149.

After receiving the certificate request and the authentication credentials 143, the certificate authority 139 can evaluate the certificate request and the authentication credentials 143. If the certificate request and the authentication credentials 143 are valid, and the authentication credentials 143 are for an authorized user, application, or machine, then the certificate authority 139 may issue a certificate 159. A copy of the issued certificate 159 may be stored in the enterprise data store 153, while another copy of the issued certificate 159 may also be provided to the messenger connecter 149.

In response, the messenger connector 149 can send the issued certificate 159 to the messenger service 119. The messenger service 119 can, in turn, provide the issued certificate 159 to the management service 116. The management service 116 can then send the issued certificate 159 to the management agent 163 in response to the certificate request.

Figure 2:
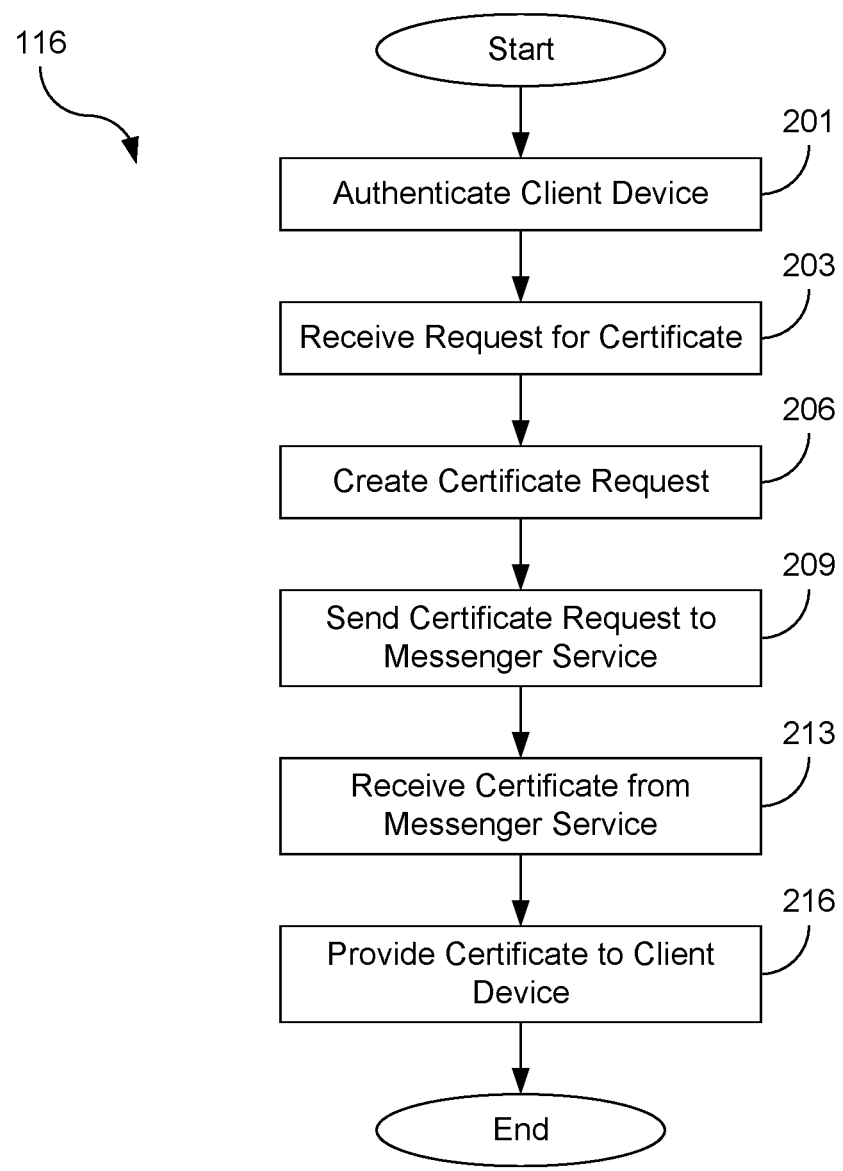
FIGS. 2 and 3 are flowcharts depicting the operation of a component of the present disclosure.

Referring next to FIG. 2, shown is a flowchart that provides one example of the operation of a portion of the management service 116. It is understood that the flowchart of FIG. 2 provides merely an example of the many different types of functional arrangements that can be employed to implement the operation of the management service 116. As an alternative, the flowchart of FIG. 2 can be viewed as depicting an example of elements of a method implemented in the management computing environment 103.

Beginning at step 201, the management service 116 may authenticate or enroll a client device 109. For example, the management agent 163 may send a username and password or other credentials to the management service 116. The management service 116 may evaluate the credentials supplied by the management agent 163 to determine whether the management agent 163 is authorized to interact with the management service 116. In some instances, the management agent 163 may send the credentials as part of an enrollment or registration process or request.

At step 203, after authenticating the management agent 163, the management service 116 may receive a request for a certificate 159 from the management agent 163. The request may be sent as part of an enrollment or registration process. However, the request may also be sent independent of enrollment or registration of the client device 109 (e.g., as part of the installation process of an application that uses a certificate 159 for client authentication). The request may also include a CA Identifier 133 that specifies which certificate authority 139 is to issue the requested certificate 159.

Next at step 206, the management service 116 can create a certificate request. For example, the management service 116 may create a request formatted for the certificate authority 139. The certificate request may also include the credential identifier 136 associated with the certificate authority 139. To determine the credential identifier 136, the management service 116 may query the management data store 123 to search for a record in the CA authentication map 126 that contains the CA identifier 133 supplied by the management agent 163. The management service 116 could then use the corresponding or respective credential identifier 136.

Then at step 209, the management service 116 can send or otherwise provide the certificate request and/or the credential identifier 136 for the certificate authority 139 to the messenger service 119. For instance, the management service 116 may invoke a function provided by an application programming interface (API) made available by the messenger service 119 to provide the certificate request and/or the credential identifier 136.

The management service can then wait until, at step 213, it receives a response from the messenger service 119. The response can include the certificate 159 issued by the certificate authority 139 in response to the certificate request.

The management service 116 can then provide the certificate 159 to the management agent 163 at step 216. For example, the management service 116 may generate a response that includes the certificate 159 and other information (e.g., a signature to verify the authenticity of the response, etc.)

Figure 3:
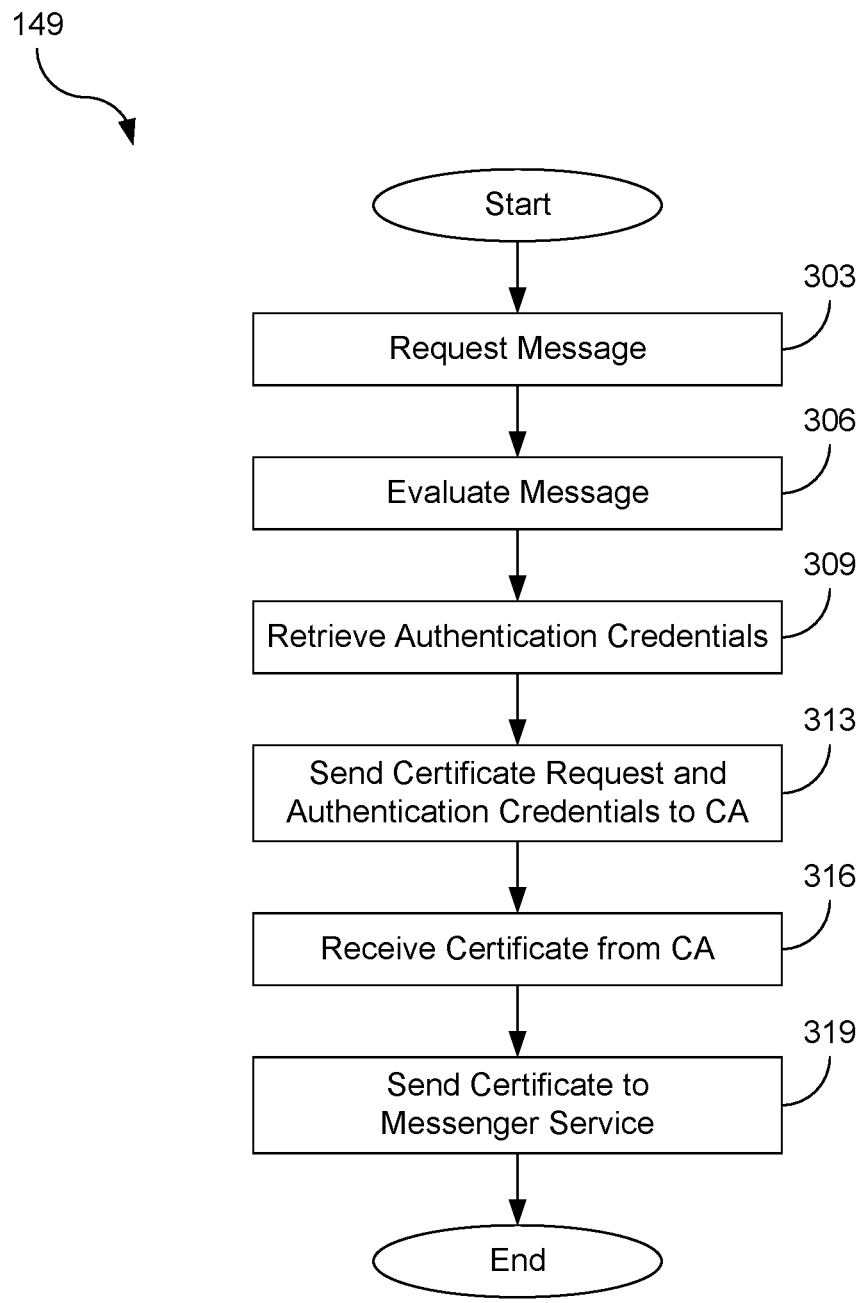

Referring next to FIG. 3, shown is a flowchart that provides one example of the operation of a portion of the messenger connector 149. It is understood that the flowchart of FIG. 3 provides merely an example of the many different types of functional arrangements that can be employed to implement the operation of the messenger connector 149. As an alternative, the flowchart of FIG. 3 can be viewed as depicting an example of elements of a method implemented in the management computing environment 103.

Beginning at step 303, the messenger connector 149 can send a request to the messenger service 119 for any messages 146 stored in a respective message queue 129. The messenger connector 149 can receive any messages 146 present in the message queue 129 in response. The messenger connector 149 may periodically request messages from the messenger service 119 in order to retrieve new messages 146 added to the message queue 129 by the messenger service 119.

Next at step 306, the messenger connector 149 can evaluate any messages 146 received from the messenger service 119. For example, the messenger connector 149 may determine that a message includes a certificate request and a credential identifier 136.

Then at step 309, the messenger connector 149 can retrieve the authentication credentials 143 identified by the respective credential identifier 136. For example, the messenger connector 149 may query the authentication credentials map 156 located in the enterprise data store 153 to identify the authentication credentials 143 associated with the credential identifier 136.

Proceeding to step 313, the messenger connector 149 can then send the certificate request specified in the message 146 and the authentication credentials 143 retrieved from the enterprise data store 153 to a certificate authority 139 located within the enterprise computing environment 106. At step 316, the messenger connector 149 can receive a certificate 159 from the certificate authority in response. Subsequently at step 319, the messenger connector 149 can send the certificate 159 to the messenger service 119 as a response to the message 146 containing the certificate request.

Figure 4:
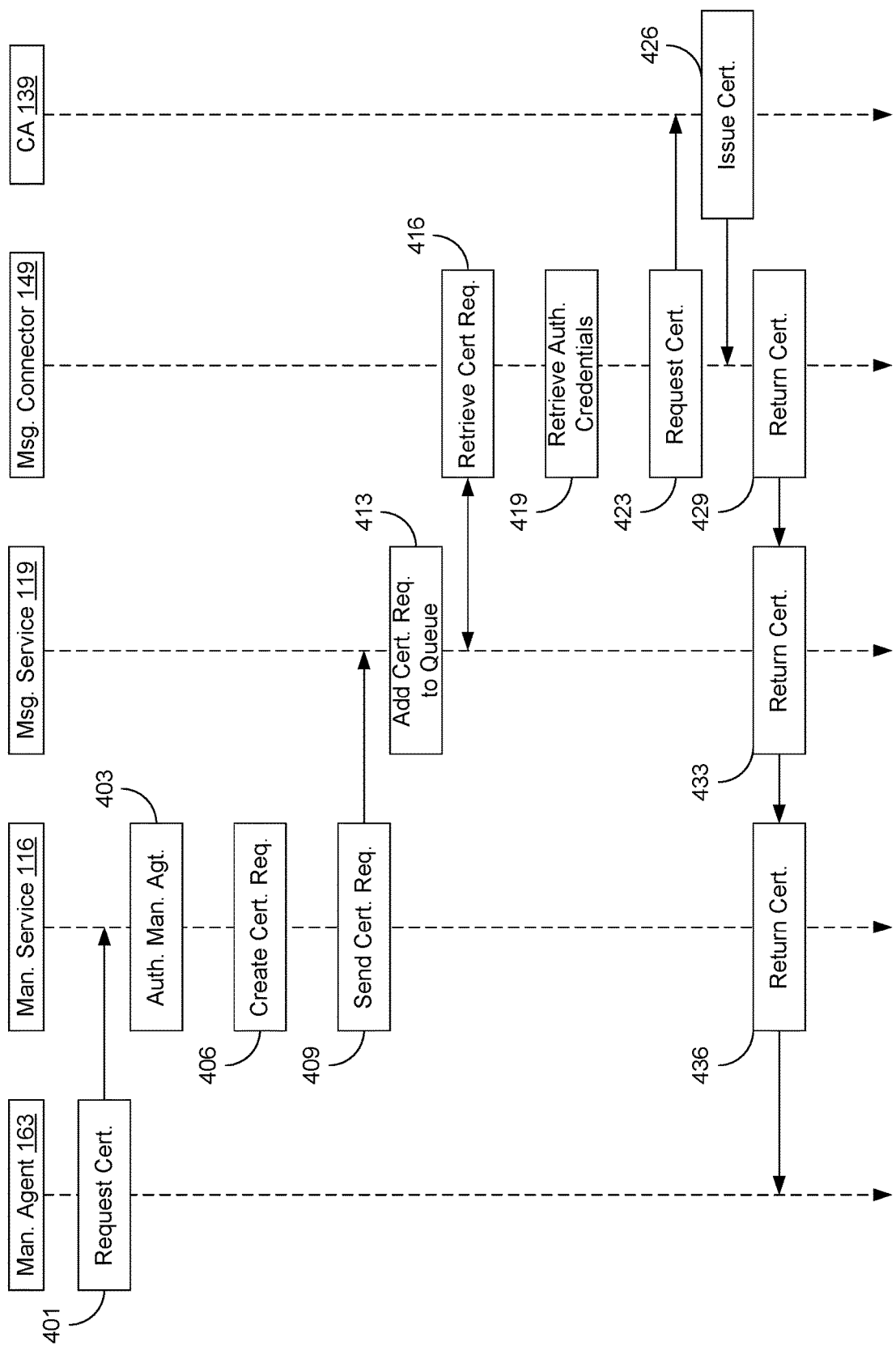
FIG. 4 is sequence diagram depicting the interaction between components of the present disclosure.

Referring next to FIG. 4, shown is a sequence diagram depicting the interaction between various components of the network environment 100. It is understood that the sequence diagram of FIG. 4 provides merely an example of many different types of interactions between the individual components of the network environment 100. As an alternative, the sequence diagram of FIG. 4 can be viewed as depicting an example of elements of a method implemented in the network environment 100.

Beginning at step 401, the management agent 163 can request a certificate 159 from the management service 116. The request can include a CA identifier 133 and potentially other information. For example, the request may also include authentication information to allow the management agent 163 to authenticate or verify its identity with the management service 116.

Next at step 403, the management service 116 can authenticate the request received from the management agent 163. For example, the management service 116 may verify user account credentials provided by the management agent 163 to verity that the management agent 163 has enrolled the client device 109 with the management service 116. Additional authentication measures can be performed according to the details of particular implementations.

If the management agent 163 is successfully authenticated by the management service 116, then the management service 116 can create a certificate request at step 406, as previously described. For example, the management service 116 may use the CA identifier 133 to determine the credential identifier 136 for the certificate authority 139 that will issue the requested certificate 159. The management service 116 may then use the CA identifier 133, the credential identifier 136, and other relevant information to create the certificate request.

The management service 116 can then send the certificate request, which can include the credential identifier 136, to the messenger service 119 at step 409. For example, the management service 116 may invoke a function defined by an API provided by the messenger service 119 to send the certificate request and credential identifier 136 to the messenger service 119. The management service 116 may also provide the CA identifier 133 to the messenger service 119 to assist the messenger service 119 in determining which message queue 129 to use to facilitate relaying the certificate request to an appropriate messenger connector 149.

Then at step 413, the messenger service 119 can create a message 146 containing the certificate request and the credential identifier 136. The message 146 can then be added to a message queue 129 for temporary storage of the message 146 until the messenger connector 149 can request the message 146 from the messenger service 119.

Next, at step 416, the messenger connector 149 can retrieve any messages 146 stored in the message queue 129, including the message 146 containing the certificate request and the credential identifier 136. For example, the messenger connector 149 may establish a connection with the messenger service 119 and send a request containing an identifier of the messenger connector 149. In response, the messenger service 119 may return any messages 146 stored in a message queue 129 associated with the identifier of the messenger connector 149. In some instances, the messenger connector 149 may use the CA identifier 133 of the certificate authority 139 for which the messenger connector 149 is retrieving messages 146.

After evaluating the message 146, at step 419, the messenger connector 149 can retrieve from the enterprise data store 153 the authentication credentials 143 identified by the credential identifier 136. For example, the messenger connector 149 may query the authentication credentials map 156 to select the authentication credentials 143 associated with the credential identifier 136 included in the retrieved message 146.

The messenger connector 149 can then request a certificate 159 at step 423 from the certificate authority 139 by sending the certificate request and the authentication credentials 143 to the certificate authority 139. After sending the certificate request to the certificate authority 139, the messenger connector 149 may wait to receive a response.

In response to receiving the certificate request and the authentication credentials 143, the certificate authority 139 can issue a certificate 159 at step 426. For example, the certificate authority 139 may validate or verify the authentication credentials 143. If the authentication credentials 143 are valid, the certificate authority 139 can generate a certificate 159 that satisfies the parameters specified in the certificate request. The certificate authority 139 can then issue the certificate 159 by returning the certificate to the messenger connector 149.

The issued certificate 159 can then be ultimately relayed back to the management agent 163. For example, after receiving the issued certificate 159, the messenger connector 149 can, at step 429, return the issued certificate 159 to the messenger service 119 as a response to the message retrieved at step 416. Then at step 433, the messenger service 119 can return the certificate 159 to the management service 116. The management service 116 can then ultimately return the issued certificate 159 to the management agent 163 at step 436 as a response to the original request for the certificate 159 that was sent by the management agent 163 at step 401.

Although the management service 116, messenger service 119, messenger connector 149, certificate authority 139, management agent 173, and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:

at least one computing device comprising at least one processor;

at least one memory comprising machine-readable instructions that, when executed by the at least one processor, cause the at least one computing device to at least:

retrieve, by a connector service within a firewalled enterprise environment along with a certificate authority, and from a messenger service in an environment outside the firewalled enterprise environment, a certificate request message comprising a credential identifier for a certificate authority, the credential identifier uniquely identifying a certificate authority authentication credential, wherein the connector service initiates retrieval of the certificate request message from the messenger service in an instance in which the firewalled enterprise environment lacks a port open to receive messages;

retrieve, by the connector service, the authentication credential based on the credential identifier;

transmit, from the connector service to the certificate authority, the certificate request message and the certificate authority authentication credential;

receive, by the connector service from the certificate authority, a certificate; and transmit, by the connector service to the messenger service, a response to the certificate request message, wherein the response comprises the certificate.

2. The system of claim 1, wherein the machine-readable instructions, when executed by the processor, further cause the at least one computing device to at least:

query, by the connector service, an authentication credentials map located within an enterprise data store of an enterprise computing environment to identify the authentication credentials stored in association with the credential identifier.

3. The system of claim 1, wherein the machine-readable instructions, when executed by the processor, further cause the at least one computing device to at least:

retrieve the certificate request message and the credential identifier from a message queue of the messenger service.

4. The system of claim 1, wherein the certificate request is formatted for the certificate authority.

5. The system of claim 1, wherein the certificate authority is executed within the firewalled enterprise environment.

6. The system of claim 1, wherein the credential identifier comprises a hash of the authentication credential.

7. The system of claim 1, wherein the machine-readable instructions, when executed by the processor, further cause the at least one computing device to at least:

transmit, by the connector service to the messenger service, a message request comprising an identifier of the connector service.

8. A method, comprising:

retrieving, by a connector service within a firewalled enterprise environment, and from a messenger service in an environment outside the firewalled enterprise environment, a certificate request message comprising a credential identifier for a certificate authority, the credential identifier uniquely identifying a certificate authority authentication credential, wherein the connector service initiates retrieval of the certificate request message from the messenger service in an instance in which the firewalled enterprise environment lacks a port open to receive messages;

retrieving, by the connector service, the authentication credential based on the credential identifier;

transmitting, from the connector service to a certificate authority, the certificate request message and the certificate authority authentication credential;

receiving, by the connector service from the certificate authority, a certificate; and transmitting, by the connector service to the messenger service, a response to the certificate request message, wherein the response comprises the certificate.

9. The method of claim 8, further comprising:

querying, by the connector service, an authentication credentials map located within an enterprise data store of an enterprise computing environment to identify the authentication credentials stored in association with the credential identifier.

10. The method of claim 8, further comprising:

retrieving the certificate request message and the credential identifier from a message queue of the messenger service.

11. The method of claim 8, wherein the certificate request is formatted for the certificate authority.

12. The method of claim 8, wherein the certificate authority is executed within the firewalled enterprise environment.

13. The method of claim 8, wherein the credential identifier comprises a hash of the authentication credential.

14. The method of claim 8, further comprising:

transmitting, by the connector service to the messenger service, a message request comprising an identifier of the connector service.

15. A non-transitory computer-readable medium, comprising machine-readable instructions that, when executed by a processor, cause a first computing device to at least:

retrieve, by a connector service within a firewalled enterprise environment, and from a messenger service in an environment outside the firewalled enterprise environment, a certificate request message comprising a credential identifier for a certificate authority, the credential identifier uniquely identifying a certificate authority authentication credential, wherein the connector service initiates retrieval of the certificate request message from the messenger service in an instance in which the firewalled enterprise environment lacks a port open to receive messages;

retrieve, by the connector service, the authentication credential based on the credential identifier;

transmit, from the connector service to a certificate authority, the certificate request message and the certificate authority authentication credential;

receive, by the connector service from the certificate authority, a certificate; and transmit, by the connector service to the messenger service, a response to the certificate request message, wherein the response comprises the certificate.

16. The non-transitory computer-readable medium of claim 15, wherein the machine-readable instructions, when executed by the processor, further cause the first computing device to at least:

query, by the connector service, an authentication credentials map located within an enterprise data store of an enterprise computing environment to identify the authentication credentials stored in association with the credential identifier.

17. The non-transitory computer-readable medium of claim 15, wherein the machine-readable instructions, when executed by the processor, further cause the first computing device to at least:
   retrieve the certificate request message and the credential identifier from a message queue of the messenger service.

18. The non-transitory computer-readable medium of claim 15, wherein the certificate request is formatted for the certificate authority.

19. The non-transitory computer-readable medium of claim 15, wherein the certificate authority is executed within the firewalled computing environment.

20. The non-transitory computer-readable medium of claim 15, wherein the machine-readable instructions, when executed by the processor, further cause the first computing device to at least:
   transmit, by the connector service to the messenger service, a message request comprising an identifier of the connector service.

* * * * *